United States Patent
Moore, IV et al.

[11] Patent Number: 5,174,483
[45] Date of Patent: Dec. 29, 1992

[54] RADIOWRAP

[76] Inventors: Edwin R. Moore, IV, 520 E. Watson; H. Daniel Jacobs, 1170 E. Redfield, both of Tempe, Ariz. 85283

[21] Appl. No.: 718,771
[22] Filed: Jun. 21, 1991
[51] Int. Cl.$^5$ .............................................. A43F 3/14
[52] U.S. Cl. ................................. 224/250; 224/253; 224/901; 24/306
[58] Field of Search ............... 224/253, 250, 901, 252; 248/205.2; 24/306, 3 M, 442

[56] References Cited

U.S. PATENT DOCUMENTS

| | | | |
|---|---|---|---|
| D. 284,372 | 6/1986 | Carpenter | D14/59 |
| 702,398 | 6/1902 | Bowyer | 224/250 |
| 3,148,812 | 9/1964 | Hilsinger | |
| 3,813,017 | 5/1974 | Pimsleur | |
| 3,990,617 | 11/1976 | Carter | |
| 4,046,295 | 9/1977 | Eichler | |
| 4,420,104 | 12/1983 | DiIenno | 224/253 |
| 4,759,963 | 7/1988 | Uso, Jr. et al. | 224/901 |
| 4,771,927 | 9/1988 | Ventura | 224/250 |
| 4,775,083 | 10/1988 | Burger et al. | 224/253 |
| 4,787,540 | 11/1988 | Barry | 224/250 |
| 4,838,466 | 6/1989 | Holmstrom | 224/253 |
| 4,896,805 | 1/1990 | Klaezak et al. | |
| 4,982,885 | 1/1991 | Severson et al. | 224/253 |
| 5,104,076 | 4/1992 | Goodall, Jr. | 224/251 |

OTHER PUBLICATIONS

Look Ma No Hands! Cordless Phone Holster Ad.

*Primary Examiner*—Linda J. Sholl

[57] ABSTRACT

A non-rigid non-mechanical carrying device for portable radiophones.

1 Claim, 2 Drawing Sheets

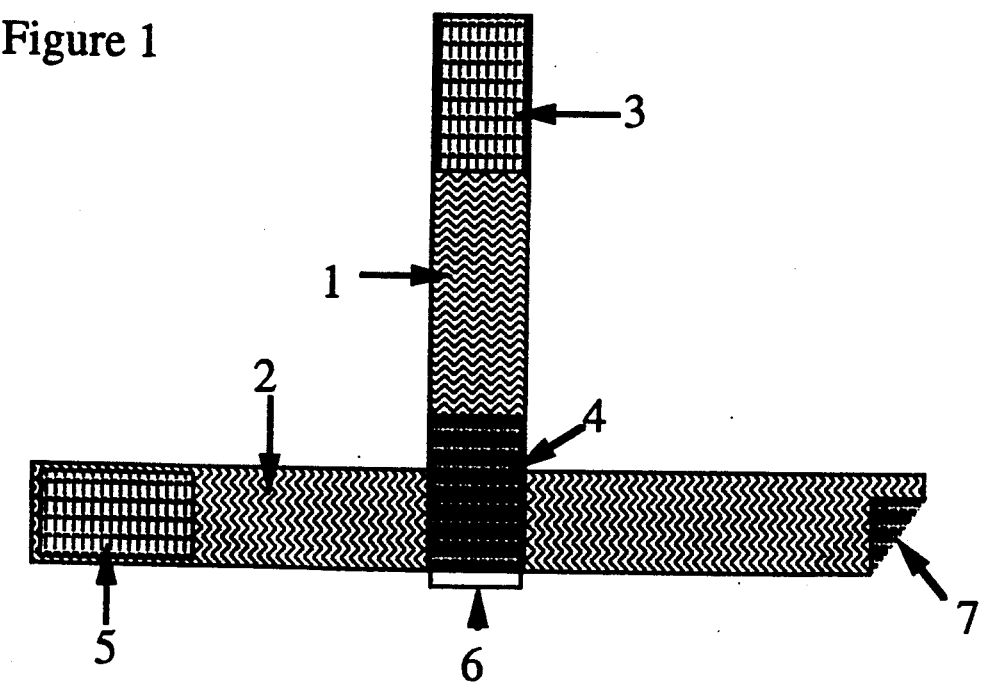
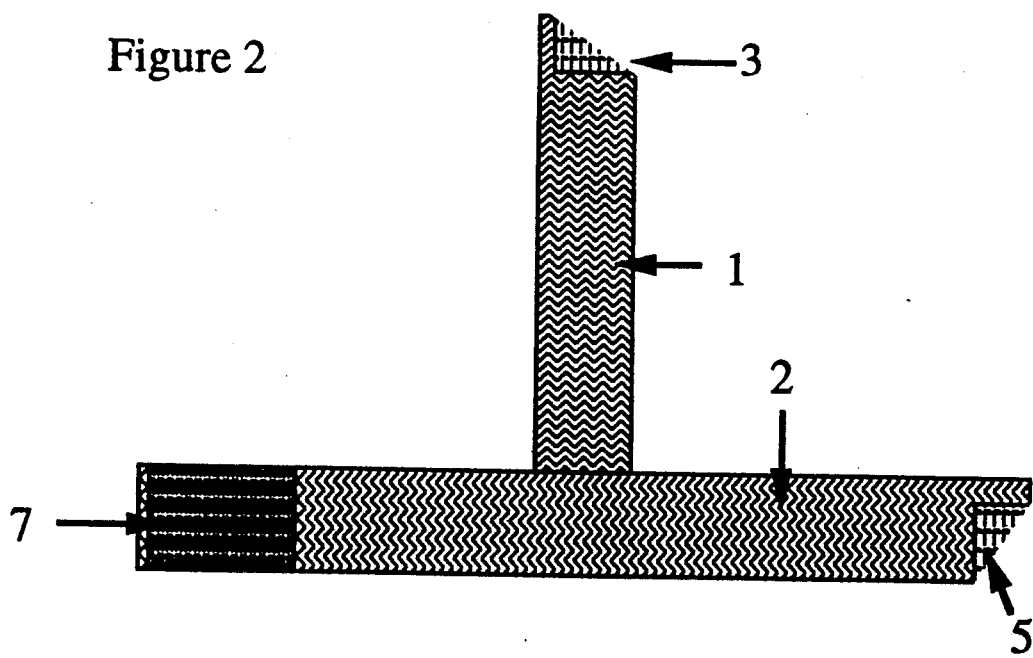

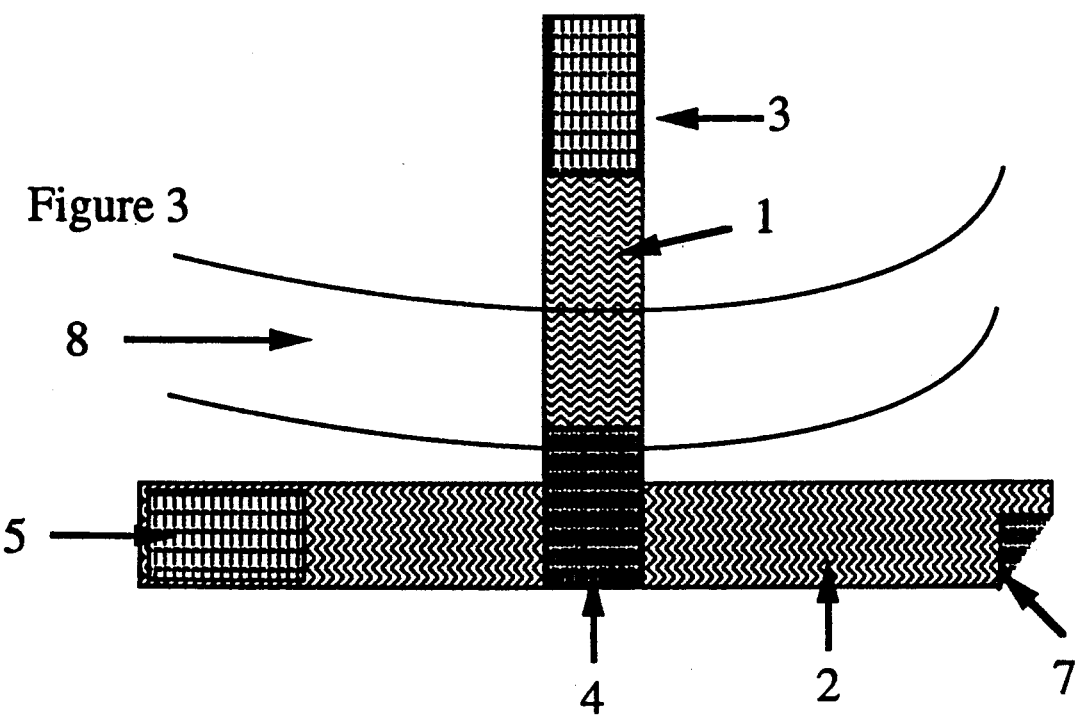
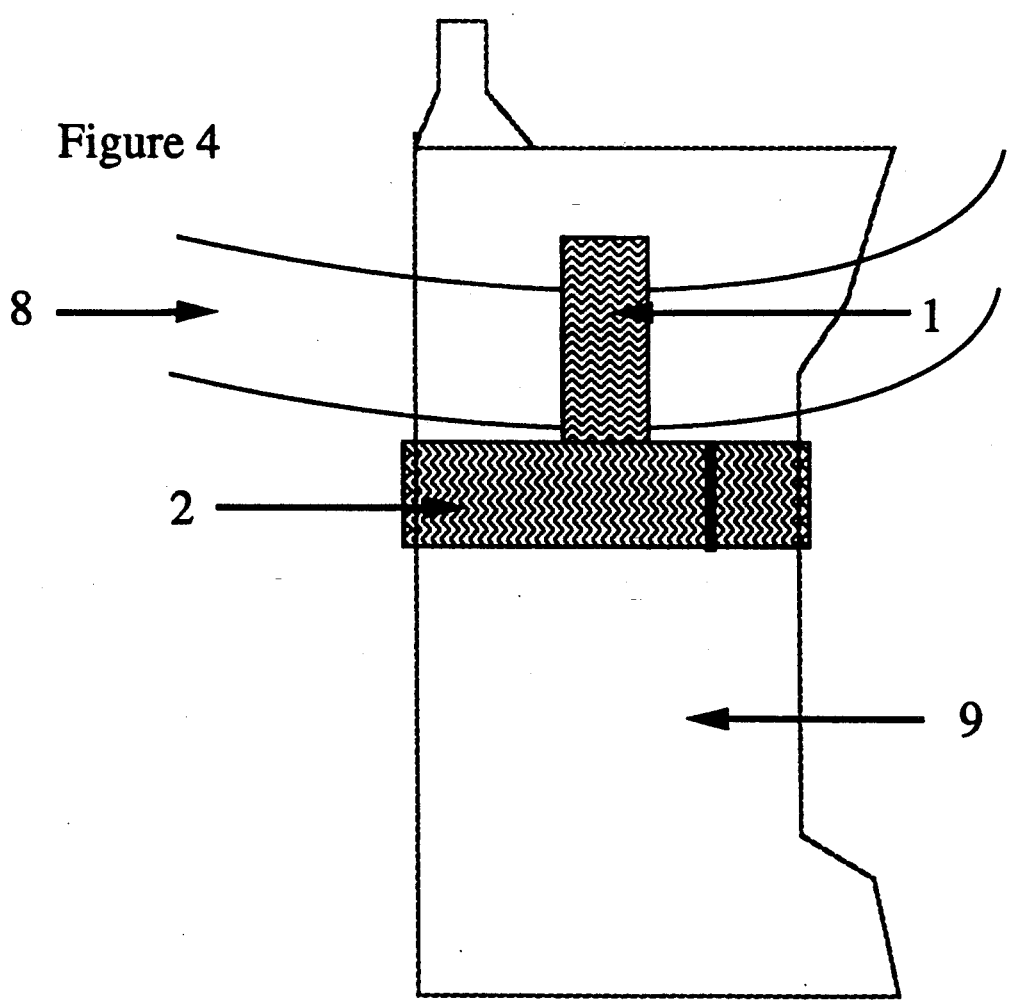

RADIOWRAP

CROSS REFERENCES

| | | |
|---|---|---|
| D.284.372 | 6/1986 | Carpenter |
| 3,148,812 | 9/1964 | Hilsinger |
| 3,813,017 | 5/1974 | Pimsleur |
| 3,990,617 | 11/1976 | Carter |
| 4,046,295 | 9/1977 | Eichler |
| 4,771,927 | 9/1988 | Ventura |
| 4,787,540 | 11/1988 | Barry |
| 4,896,805 | 1/1990 | Klaezak et al |

BACKGROUND OF THE INVENTION

The present invention relates to carrying devices at the waistband or attached to the belt of the user. More specifically, the present invention pertains to a on-rigid, non-elastic non-mechanical carrying device for portable radiophones.

As radio telephony moves into the consumer marker more and more people are purchasing hand held portable radiophones. Carrying the phone then becomes a problem. Typically the manufacturers of radiophones provide leather or vinyl carrying cases for the portable radiophones. These cases may or may not have a means of attaching the radiophones to the waistband. Of the carrying cases known to applicants which have a means of attaching the carrying case to the waistband, the carrying cases have a rigid clip, usually comprised of metal, which attaches the radiophones to the users waistband or belt. These clips become unreliable for securely keeping the carrying case attached to the waistband or belt over time because they can become loose as the metal clip fatigues. Also, if the user of the prior art must move quickly, such as running or jumping, the carrying case may become unattached. This along with the uncomfortableness of the rigid metal clip makes the carrying cases of the prior art with metal clips objectionable. Those carrying cases which do not have a clip require the user to carry the radiophone, restricting the user's freedom of movement.

Prior art discloses several methods for carrying portable radios as the waistband. Eichler discloses, in U.S. Pat. No. 4,046,295, a rigid carrying device for elongated portable articles such as portable radios. A rigid clip-on carrying device for portable radios is disclosed in U.S. Pat. No. 3,990,617 granted to Carter. A phone holder to hold a portable telephone handset and a rigid metal clip to attach it to the waist band are disclosed in U.S. Pat. No. 4,771,927 granted to Ventura.

There are various carrying devices known to applicants for carrying radiophones at the waist band. These devices completely cover the radiophones and have a rigid means of support to attach said device to the waistband or belt. This support is usually a rigid metal clip. Because the rigid clip can damage clothing and can be uncomfortable for the user and becomes unreliable, the prior art is objectionable. Applicants know of no non-rigid carrying devices for radiophones.

The present invention provides a non-rigid, non-mechanical carrying device for portable radiophones which will allow the user to carrying the radiophone at the user's waistband attached to the belt or belt loop. The present invention can be attached to the belt without having to thread the belt through it making it very simple to attach.

SUMMARY OF THE INVENTION

The present invention provides a non-rigid, non-elastic, non-mechanical carrying device for portable radiophones which will allow the user to carry the portable radiophone at the user's waistband. The present invention is comprised of two straps, a phone strap and a support strap, perpendicular to each other with the support strap bisecting the phone strap and attached to the phone strap flush with one end so that the support strap end is tangent with the phone strap. The support strap is threaded around the belt or belt loop and is folded over on itself with the belt or belt loop being in the middle of the loop formed by folding over the support strap and is fastened with hoop and loop fastening material. The radiophone is then placed in the center of the phone strap and the ends of the phone strap are brought around the radiophone and attached to each other with hook and loop fastening material. Thus forming a strong non-rigid loop which keeps the radiophone in place. The present invention will carry any radiophone that has a ledge on the earpiece or any radiophone which has a smaller circumference in the middle portion of the radiophone than the ends of said radiophone, such as the Motorola F and H series radiophones. The straps may be fabricated of leather, nylon or polypropolene webbing and other like materials with or without print or display advertising.

It is an object of this invention to provide a non-rigid, non-elastic, non-mechanical carrying device for portable radiophones which is attached to the user's belt or belt loop. It is another object of this invention to provide a non-rigid, non-mechanical carrying device for portable radio telephones will not become accidentally detached from the users belt or belt loop.

It is still another object of this invention to provide a non-rigid, non-elastic, non-mechanical carrying device for portable radio telephones which will be constructed of durable material which is effective and efficient and is simple to assemble and inexpensive to manufacture.

BRIEF DESCRIPTION OF THE DRAWINGS

FIG. 1 is a front view of the invention before it is attached to the belt or belt loop and before the radiophones is enclosed in the phone loop.

FIG. 2 is a back view of the invention before it is attached to the belt or beltloop and before the radiophone is enclosed in the phone loop.

FIG. 3 is a perspective view of the present invention as it is placed on the users belt.

FIG. 4 is a perspective view of the present invention in use with a radiophone shown in phantom and the present invention attached to the users belt.

DESCRIPTION OF THE PREFERRED EMBODIMENTS

FIG. 1 is a front view of the invention showing the two straps which comprise the present invention. Support strap 1 is sewn with a box x pattern to phone strap 2 where support strap 1 bisects phone strap 2 at their intersection 6. Support strap 1 has hook 3 and loop 4 fastening material sewn at each end with a box x pattern. The hook fastening material 3 of the support strap 1 can be looped around a belt or through a beltloop and is attached to the loop side 4 of support strap 1. This allows the user to attach the present invention to his belt quickly and with minimum effort. Phone strap 2 has hook fastening material 5 sewn on with a box x pattern on the front view FIG. 1. The loop fastening material 7 is at the opposite end of phone strap 2 and the back side of phone strap 2. FIG. 2 is a back view of the present invention showing the support strap 1, the phone strap 2, the hook fastening material 3 for the support strap 1 and the hook 5 and loop 7 fastening material for phone strap 2. In FIG. 3 the support strap 1 is threaded around a belt 8 and the end with the hook fastening material 3 is folded down to meet with the loop fastening material 4. Forming a strong support loop thus attaching the present invention to the users belt. FIG. 4 illustrates the radiophone 8 placed in the middle of phone strap 2 and the ends of phone strap 2 are brought around the radiophone 8 and are attached with the hook fastening material 5 on to the loop fastening material 7 forming a non-rigid, non-mechanical, non-elastic strong continuous loop around the radiophone 8.

The present invention is designed for radiophones which have a smaller diameter in the middle portion of the radiophone 9 FIG. 4 then at top and bottom ends of the radiophone. FIG. 4 illustrates the loop formed around the smaller portion of the radiophone 8 and thus will not allow the radiophone 8 to become detached from the present invention. The preferred embodiment will use non-elastic one inch medium weight polypropolene webbing for straps 1 and 2 as seen in FIG. 1. The hook and loop fastening material found in FIG. 1 at 3, 5, 6 and 7 will be one inch in width in the preferred embodiment. The heaviest radiophone having the shape of radiophone 9 (FIG. 4) for which the present invention is designed weighs 25 ounces. When the radiophone is placed in the present invention it takes at least 45 pounds of downward force on radiophone 9 to cause the hook and loop material to yield. The strength of the present invention in the preferred embodiment allows the user to carry his phone at his waistband with out the worry of the phone become detached from the present invention while allowing the user a wide range of motion whether walking or running the radiophone stays attached. To remove the phone from the present invention will the user has to do is pull the phone strap to separate the hook & loop fastening material. The materials comprising the present invention are non-rigid and therefore the present invention is comfortable to wear. The present invention allows the user to attach the present invention easily to his belt or beltloop with minimum effort.

Motorola Inc. has produced millions of radiophones which have the shape of radiophone 9 (FIG. 4). The only option these potential users of the present invention have is to purchase a carrying case, at a cost of 20 to 80 U.S. dollars, which has a rigid means of attaching the carrying case to the waistband, place the phone in a pocket which will soon become worn, or to carry the phone and thereby restrict their freedom of movement.

The aforementioned description of the present invention in the preferred embodiment is the most practical and cost effective means for producing a non-rigid non-mechanical carrying device for portable radiophones which have a ledge of a smaller circumference in the middle portion of the radiophone then at the top or bottom ends. The present invention is simple as those skilled in the art will recognize. It is light weight and designed so that the hook fastening material never comes in contact with the users clothing as the hook fastening material damages textile materials. The disadvantages of the prior art, such as; rigidness, elasticity, expense and the unreliability of keeping the carrying device attached, are completely eliminated by the present invention. Those skilled in the art will appreciate that the present invention can be modified and therefore the present invention is not limited to the aforementioned detail but encompasses any and all equivalent apparatus or arrangements covered under the following claims.

We claim:
1. A carrying device for a portable radiophone having a ledge or a smaller circumference in a middle portion of the radiophone than at a top or bottom portion, said carrying device comprising:
   a non-elastic support strap having a first side, a second side, a first end and a second end; cooperating loop and hook fastening material attached to the first and second ends on the first side of the support strap for securing the first and second ends together to form a loop detachable to a user's belt or belt loop;
   a non-elastic phone strap having a first side, a second side, a first end, a middle portion and a second end; cooperating loop and hook fastening material attached to the first end on the first side and to the second end on the second side of the phone strap for securing the first and second ends of the phone strap together; the phone strap sized to retain the middle portion of the radiophone with the first and second ends secured together; the second side at the second end of the support strap being permanently attached to the first side at the middle portion of the phone strap, the support strap being perpendicular to the phone strap when attached.

* * * * *